(12) United States Patent
Hsiao et al.

(10) Patent No.: US 8,164,705 B2
(45) Date of Patent: Apr. 24, 2012

(54) LIQUID CRYSTAL DISPLAY WITH FRAME HAVING LIQUID CRYSTAL PANEL FIXING MEMBER

(75) Inventors: Chih-Chung Hsiao, Miao-Li County (TW); Ping-Shan Ko, Miao-Li County (TW)

(73) Assignee: Chimei Innolux Corporation, Miao-Li County (TW)

( * ) Notice: Subject to any disclaimer, the term of this patent is extended or adjusted under 35 U.S.C. 154(b) by 0 days.

(21) Appl. No.: 13/082,325

(22) Filed: Apr. 7, 2011

(65) Prior Publication Data

US 2011/0181807 A1    Jul. 28, 2011

Related U.S. Application Data

(63) Continuation of application No. 11/978,452, filed on Oct. 29, 2007, now Pat. No. 7,936,414.

(30) Foreign Application Priority Data

Oct. 27, 2006   (TW) ................................ 95139826 A (51) Int. Cl.
*G02F 1/1333* (2006.01)

(52) U.S. Cl. ................. 349/58; 349/59; 349/60; 345/87; 361/681

(58) Field of Classification Search .............. 349/58–60; 345/87; 361/681
See application file for complete search history.

(56) References Cited

U.S. PATENT DOCUMENTS

| | | | | |
|---|---|---|---|---|
| 5,838,400 A | * | 11/1998 | Ueda et al. | 349/58 |
| 7,048,418 B2 | * | 5/2006 | Hur et al. | 362/457 |
| 7,746,420 B2 | * | 6/2010 | Chang | 349/60 |

* cited by examiner

*Primary Examiner* — Huyen Ngo
(74) *Attorney, Agent, or Firm* — WPAT., P.C.; Justin King (57) ABSTRACT

An exemplary liquid crystal display includes a liquid crystal panel, and a one-piece frame accommodating the liquid crystal panel. The frame includes a surrounding wall defining a notch in the surrounding wall, a supporting board extending inward from an inner surface of the surrounding wall, and a fixing member received in the notch. The surrounding wall and the supporting board cooperatively define a space for accommodating the liquid crystal panel. The fixing member is inclined toward the space in a free state, and is outwardly pressed by application of an external force in a direction away from the space to allow the liquid crystal panel to be placed in the space and on the supporting board, and elastically holds the liquid crystal panel in position against the supporting board after releasing of the external force.

20 Claims, 8 Drawing Sheets

LIQUID CRYSTAL DISPLAY WITH FRAME HAVING LIQUID CRYSTAL PANEL FIXING MEMBER

CROSS-REFERENCE TO RELATED APPLICATION

This application is a continuation application of U.S. patent application Ser. No. 11/978,452, filed Oct. 29, 2007 and entitled "LIQUID CRYSTAL DISPLAY WITH FRAME HAVING LIQUID CRYSTAL PANEL FIXING MEMBER." The disclosure of such parent application is incorporated herein by reference.

BACKGROUND

1. Technical Field

The present invention relates to a liquid crystal display (LCD) that includes a frame, a liquid crystal panel accommodated in the frame and fixed in the framed by at least one liquid crystal panel fixing member.

2. Description of Related Art

Liquid crystal displays are commonly used as display devices for compact electronic apparatuses, because they not only provide good quality images but are also very thin.

Figure 8:
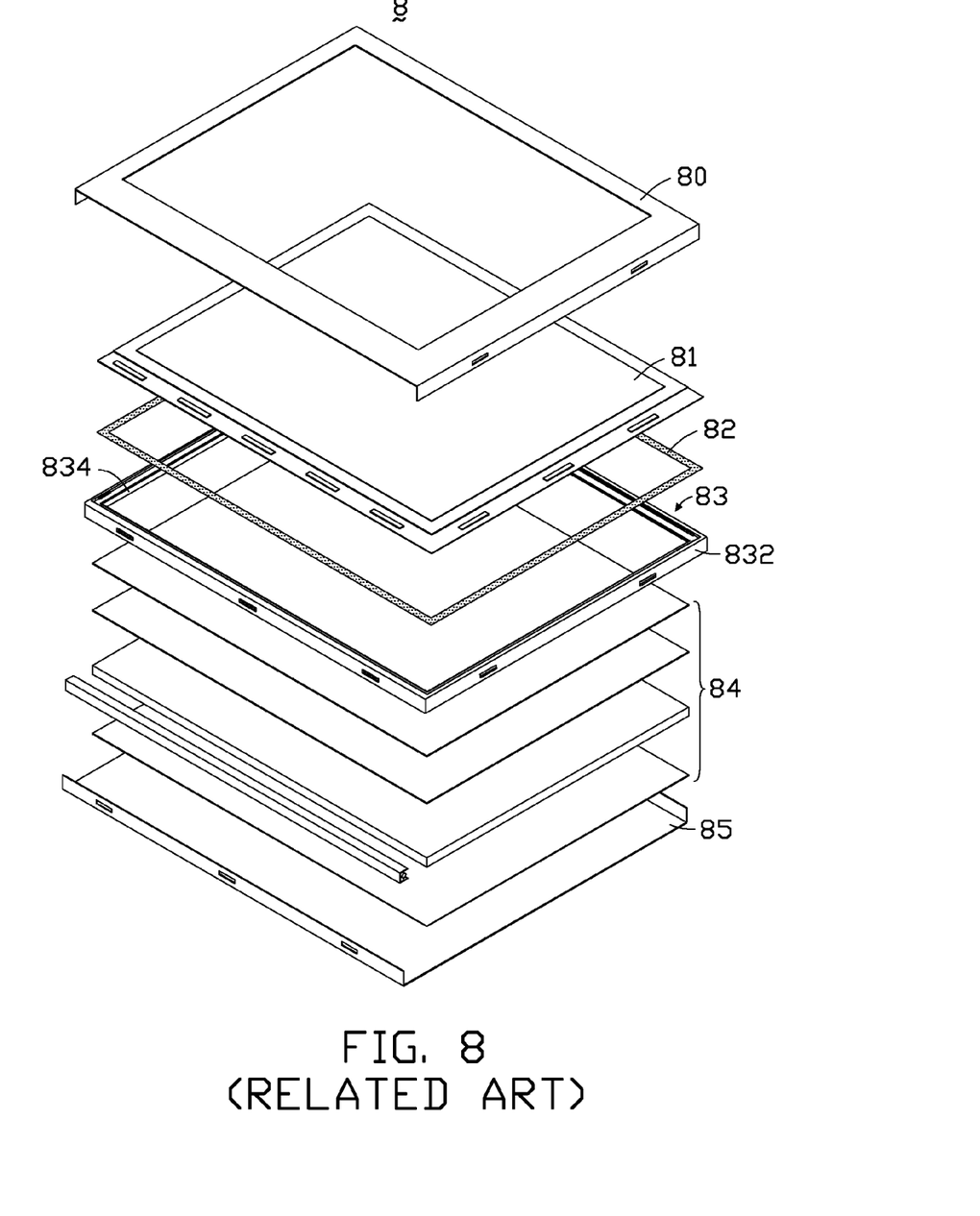
FIG. 8 is an exploded, isometric view of a conventional liquid crystal display.

Referring to FIG. 8, a typical liquid crystal display includes a top bezel 80, a liquid crystal panel 81, a frame-shaped piece of double-sided adhesive tape 82, a plastic frame 83, a backlight module 84, and a bottom tray 85, arranged in that order from top to bottom. The plastic frame 83 includes four side walls 832 connected end to end, and an annular supporting board 834 inwardly extending from inner surfaces (not labeled) of the side walls 832.

When the liquid crystal display 8 is assembled, the adhesive tape 82 is adhered to top edge surfaces (not labeled) of the supporting board 834 and bottom peripheral regions (not labeled) of the liquid crystal panel 81. Thereby, the liquid crystal panel 81 is fixed to the plastic frame 83.

However, the expensive adhesive tape 82 generally adds to the cost of the liquid crystal display 8. Further, the chemical stability of the adhesive tape 82 is liable to be harmed under different conditions, particularly high temperatures; and relative movements may occur between the liquid crystal panel 81 and the plastic frame 83. When this happens, some adhesive material of the adhesive tape 82 may contaminate non-peripheral regions of liquid crystal panel 81, and the optical performance of the liquid crystal panel 81 may be seriously impaired. Moreover, the need of carefully adhering the adhesive tape 82 to the liquid crystal panel 81 further contributes to the cost of manufacturing the liquid crystal display 8.

What is needed, therefore, is a liquid crystal display that can overcome the above-described deficiencies.

SUMMARY

In one preferred embodiment, a liquid crystal display includes a liquid crystal panel, and a one-piece frame accommodating the liquid crystal panel. The frame includes a surrounding wall defining at least one notch in an upper side of the surrounding wall, a supporting board extending inward from an inner surface of the surrounding wall, and at least one liquid crystal panel fixing member. The surrounding wall and the supporting board cooperatively define a space for accommodating the liquid crystal panel. The at least one liquid crystal panel fixing member is upwardly extending from bottom of the at least one notch, the at least one liquid crystal panel fixing member is deformable and inclined towards the space in a free state, and is capable of being outwardly pressed by application of an external force in a direction away from the space to allow the liquid crystal panel to be placed in the space, and elastically pressing the liquid crystal panel toward the supporting board after releasing of the external force.

Other aspects, novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION

Reference will now be made to the drawings to describe preferred and exemplary embodiments of the present invention in detail.

Figure 1:
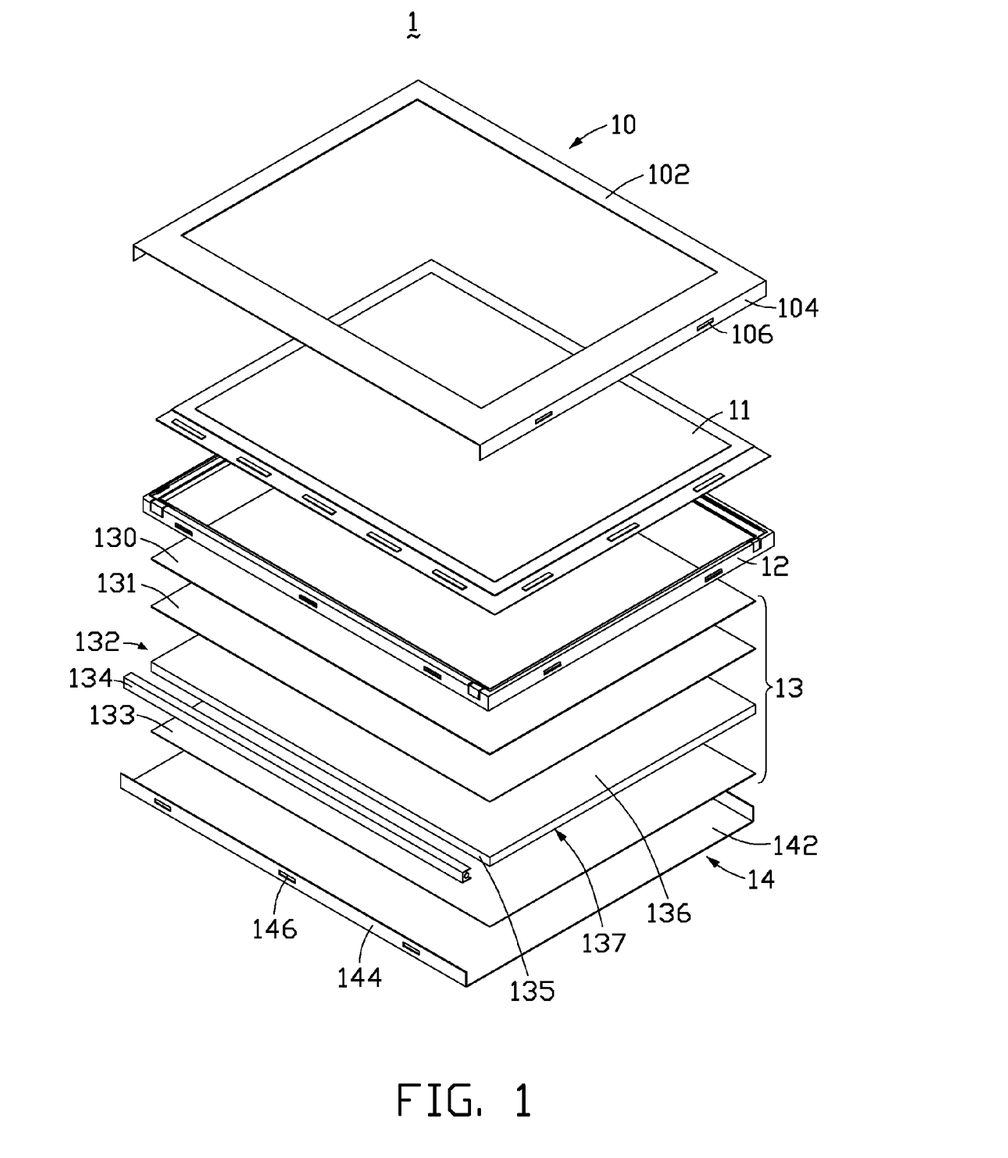
FIG. 1 is an exploded, isometric view of a liquid crystal display according to a first embodiment of the present invention, the liquid crystal display including a frame.

Referring to FIG. 1, a liquid crystal display 1 according to a first embodiment of the present invention is shown. The liquid crystal display 1 includes a top bezel 10, a liquid crystal panel 11, a frame 12, a backlight module 13, and a bottom tray 14, arranged in that order from top to bottom.

The top bezel 10 includes a frame-shaped top plate 102, and a pair of first side plates 104 downwardly extending from two opposite short sides of the top plate 102. Each of the first side plates 104 has two first notches 106 defined therein. The top bezel 10 is preferably made from iron, steel, aluminum, magnesium, or a material containing any suitable alloy thereof.

Figure 2:
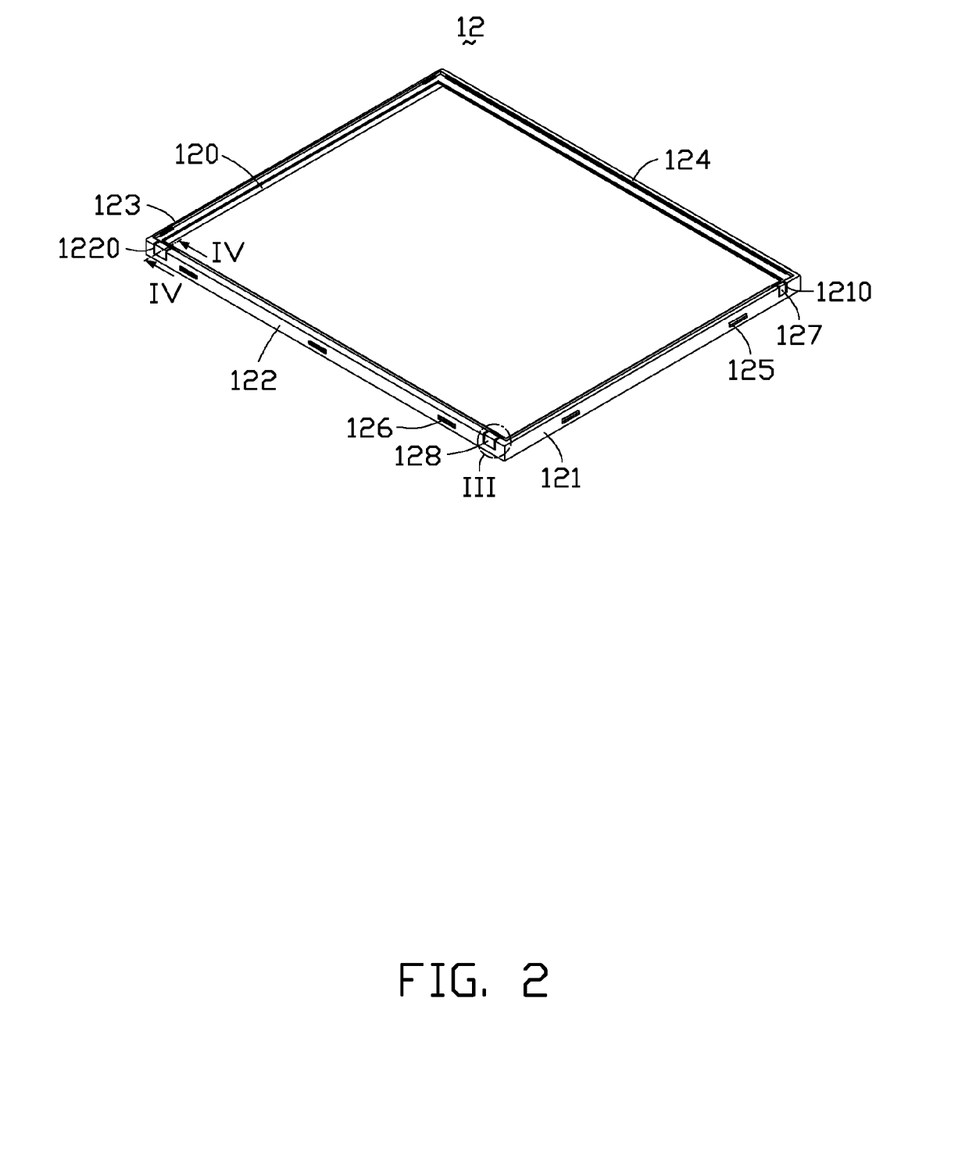
FIG. 2 is an isometric view of the frame of FIG. 1.

Referring also to FIG. 2, the frame 12 includes a four-sided frame-shaped supporting board 120, a first side wall 121, a second side wall 122, a third side wall 123, and a fourth side wall 124. The first, second, third, and fourth side walls 121, 122, 123, 124 are consecutively arranged end to end in that order. The supporting board 120 inwardly extends from inner surfaces (not labeled) of the first, second, third, and fourth side walls 121, 122, 123, 124; thereby, the frame 12 defines a generally rectangular space (not labeled) for accommodating the liquid crystal panel 11 and the backlight module 13. The frame 12 is preferably made from polycarbonate, another kind of plastic, or another suitable material.

The first and third side walls 121, 123 each include two first ears 125 outwardly extending from outer surfaces (not labeled) thereof. The first ears 125 of the first and third side walls 121, 123 respectively correspond to the first notches 106 of the first side plates 104 of the top bezel 10. The second and fourth side walls 122, 124 each include three second ears 126 outwardly extending from outer surfaces (not labeled) thereof.

The first side wall 121 further includes a second notch 1210 in an upper side (not labeled) thereof, and a first elastic member 127 upwardly extending from bottom of the second notch 1212. The first elastic member 127 are located adjacent to an edge portion (not labeled) of the first side wall 121. The second side wall 122 includes a pair of third notches 1220 in an upper side (not labeled) thereof, and a pair of second elastic members 128 respectively upwardly extending from bottoms of the pair of second notches 1210. The pair of second elastic members 128 are located at two opposite edge portions (not labeled) of the second side wall 122. The first and second elastic members 127, 128 are arranged at points of an imaginary triangle. In the illustrated embodiment, the first and second elastic members 127, 128 are inseparably formed with the frame 12, and are elastically deformable. For example, the frame 12 and the first and second elastic members 127, 128 can be formed as a single body in a molding process.

Figure 3:
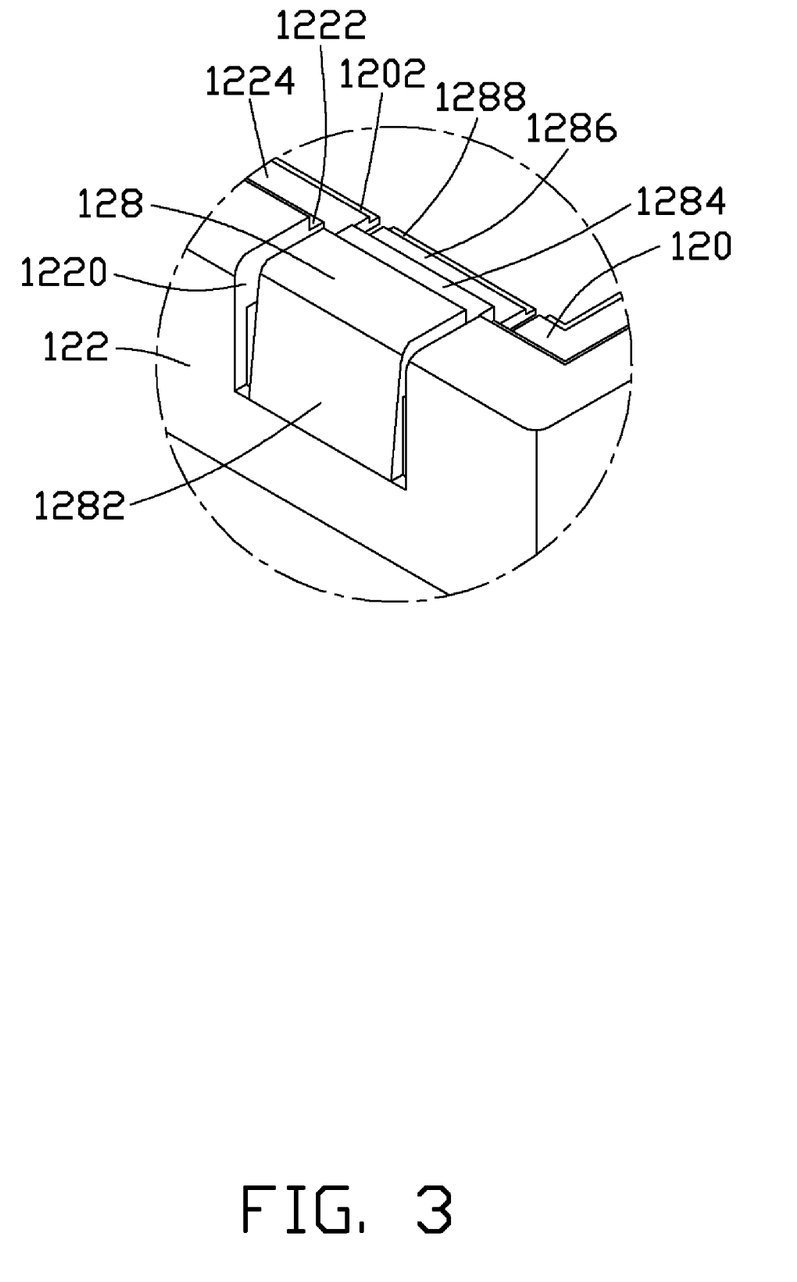
FIG. 3 is an enlarged view of a circled portion III of FIG. 2.
Figure 4:
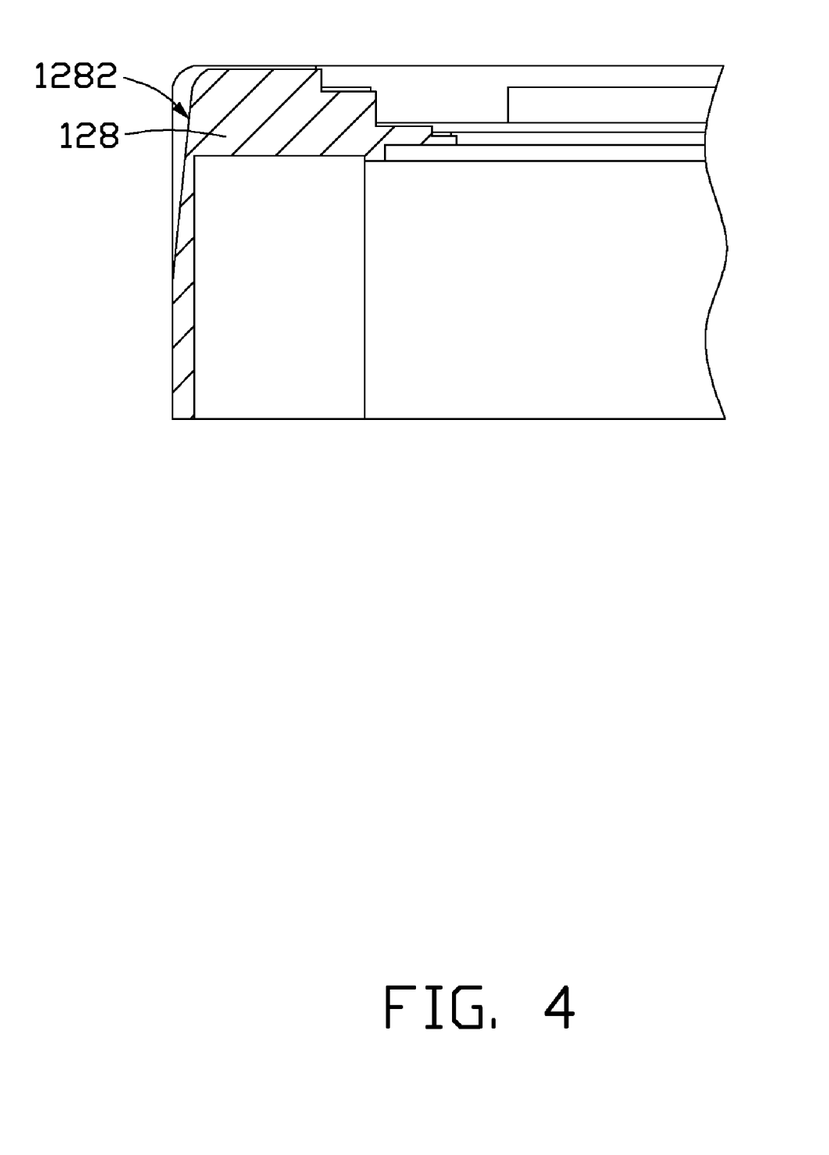
FIG. 4 is an enlarged, cross-sectional view taken along line IV-IV of FIG. 2.

Referring also to FIG. 3 and FIG. 4, each of the first, second, third, and fourth side walls 121, 122, 123, 124 defines a first groove 1222 at a top portion thereof. The supporting board 120 defines a second groove 1202 at a top portion thereof. A third groove 1224 is defined where the first, second, third, and fourth side walls 121, 122, 123, 124 adjoin the supporting board 120, and the third groove 1224 is parallel to the first, second, third, and fourth side walls 121, 122, 123, 124. The first, third, and second grooves 1222, 1224, 1202 are defined in that order from top to bottom, and communicate with the rectangular space.

Each of the first and second elastic members 127, 128 defines a fourth groove 1284, a fifth groove 1286, and a sixth groove 1288 in that order from top to bottom. The fourth, fifth, and sixth grooves 1284, 1286, 1288 communicate with the rectangular space. The fourth groove 1284 corresponds to the first groove 1224, the fifth groove 1286 corresponds to the third groove 1224, and the sixth groove 1288 corresponds to the second groove 1202. The first and second elastic members 127, 128 are inclined toward the rectangular space in a free state. Horizontal surfaces (not labeled) defining the fourth, fifth, and sixth grooves 1284, 1286, 1288 of the first and second elastic members 127, 128 are below respective horizontal surfaces (not labeled) defining the first, third, and second grooves 1222, 1224, 1202. Each of the first and second elastic members 127, 128 includes an outer surface 1282 inwardly inclined toward the rectangular space.

The backlight module 13 includes a first brightness enhancement film (BEF) 130, a second BEF 131, a light guide plate (LGP) 132, a reflective film 133, and a light source 134. The first BEF 130, the second BEF 131, the light guide plate 132, and the reflective film 134 are arranged in that order from top to bottom. The light source 134 is located adjacent to the light guide plate 132.

The light guide plate 132 is substantially rectangular. The light guide plate 132 includes a light incident surface 135, a top light emitting surface 136 perpendicular to the light incident surface 135, and a bottom surface 137. The light source 134 is adjacent to the light incident surface 135 of the light guide plate 132 for providing light beams to the light guide plate 132. The second BEF 131 is adjacent to the light emitting surface 136 of the light guide plate 132. The reflective film 133 is adjacent to the bottom surface 137 of the light guide plate 132. The light source 134 includes a linear illuminator (not shown). In the illustrated embodiment, the light source 134 includes a cold cathode fluorescent lamp (CCFL). The light guide plate 132 can for example be made from polycarbonate (PC) or polymethyl methacrylate (PMMA), and can be manufactured by an injection molding method.

The bottom tray 14 includes a bottom plate 142, and a pair of second side plates 144 upwardly extending from two opposite long sides of the bottom plate 142. Each of the second side plates 144 has three fourth notches 146 defined therein. The fourth notches 146 respectively correspond to the second ears 126 of the frame 12. The bottom tray 14 can for example be made from iron, aluminum, magnesium, any suitable material that includes an alloy of these, or another suitable material.

The liquid crystal panel 11 can be secured to the frame 12 by the following steps. First, one corner (not labeled) corresponding to the first elastic member 127 of the liquid crystal panel 11 is pre-localized. The first elastic member 127 is outwardly pressed in a direction away from the rectangular space such that the horizontal and vertical surfaces (not labeled) defining the fifth groove 1286 of the first elastic member 127 are substantially coplanar with the horizontal and vertical surfaces (not labeled) defining the third groove 1224, respectively. The corner of the liquid crystal panel 11 corresponding to the first elastic member 127 is positioned at the supporting board 120. When the first elastic member 127 is released, the corner of the liquid crystal panel 11 is pressed toward the third side wall 123 and slightly toward the supporting board 120 by the first elastic member 127. Second, the liquid crystal panel 11 is elastically secured at the supporting board 120. Similar to the above-described steps, the second elastic members 128 are outwardly pressed until bottom peripheral regions (not labeled) of the liquid crystal panel 11 fully abut the supporting board 120. When the second elastic members 128 are released, the other two corners (not labeled) of the liquid crystal panel 11 are respectively pressed toward the fourth side wall 124 and slightly toward the supporting board 120 by the second elastic members 128. The outer surface 1282 of the first elastic member 127 is substantially coplanar with the outer surface (not labeled) of the first side wall 121, and the outer surfaces 1282 of the second elastic members 128 are substantially coplanar with the outer surface (not labeled) the second side wall 122. Thus, the liquid crystal panel 11 is conveniently secured to the frame 12. Detachment of the liquid crystal panel 11 is essentially the reverse of the above-described installation procedure.

The liquid crystal panel 11 can be conveniently secured to the frame 12 or be detached from the frame 12 without any adhesive tape and without the need for carefully adhering the adhesive tape to the liquid crystal panel 11. Thus, the liquid crystal display 1 can be efficiently manufactured with a reduced cost. Further, the stability of the first and second elastic members 127, 128 is high, so that the assembly resists relative movement between the liquid crystal panel 11 and the frame 12. Therefore, the optical performance of the liquid crystal panel 11 can be reliably maintained.

Figure 5:
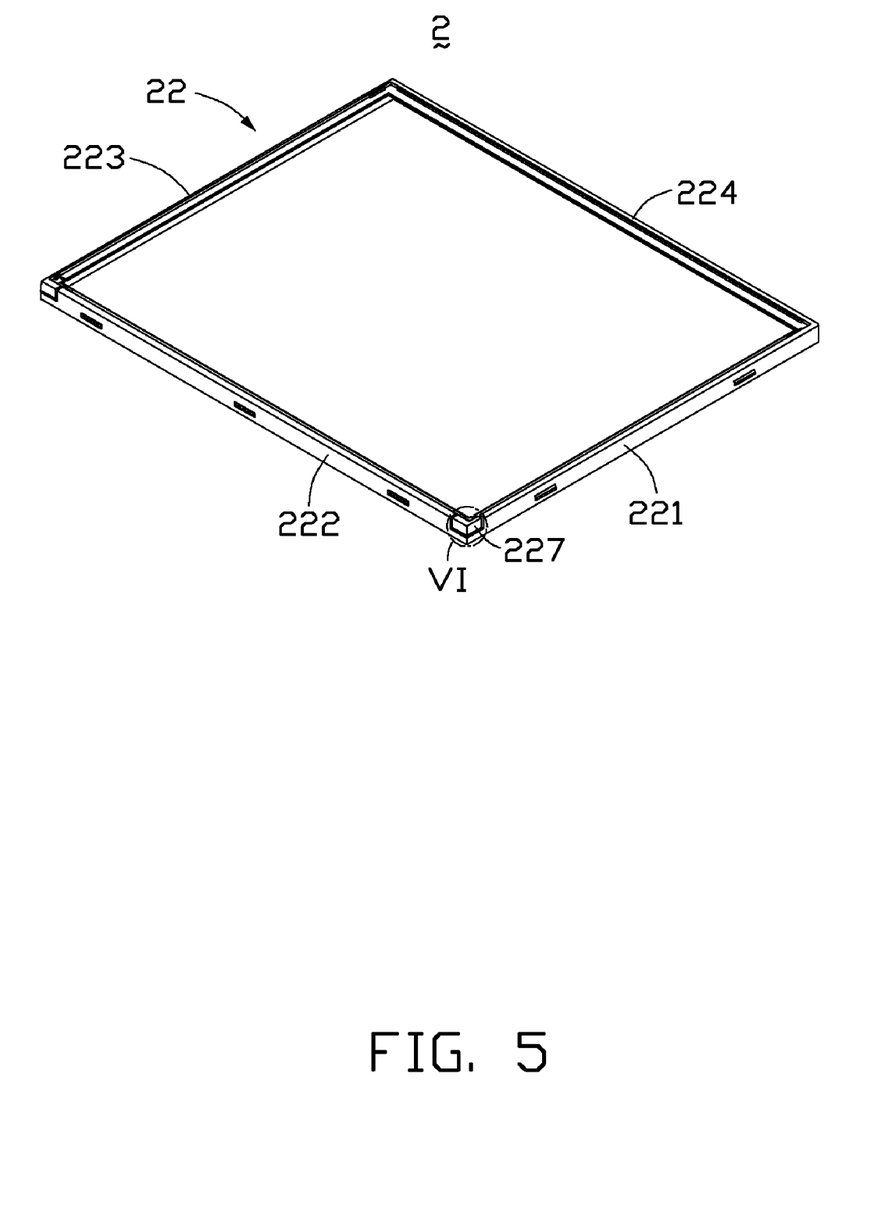
FIG. 5 is an isometric view of a frame of a liquid crystal display according to a second embodiment of the present invention.
Figure 6:
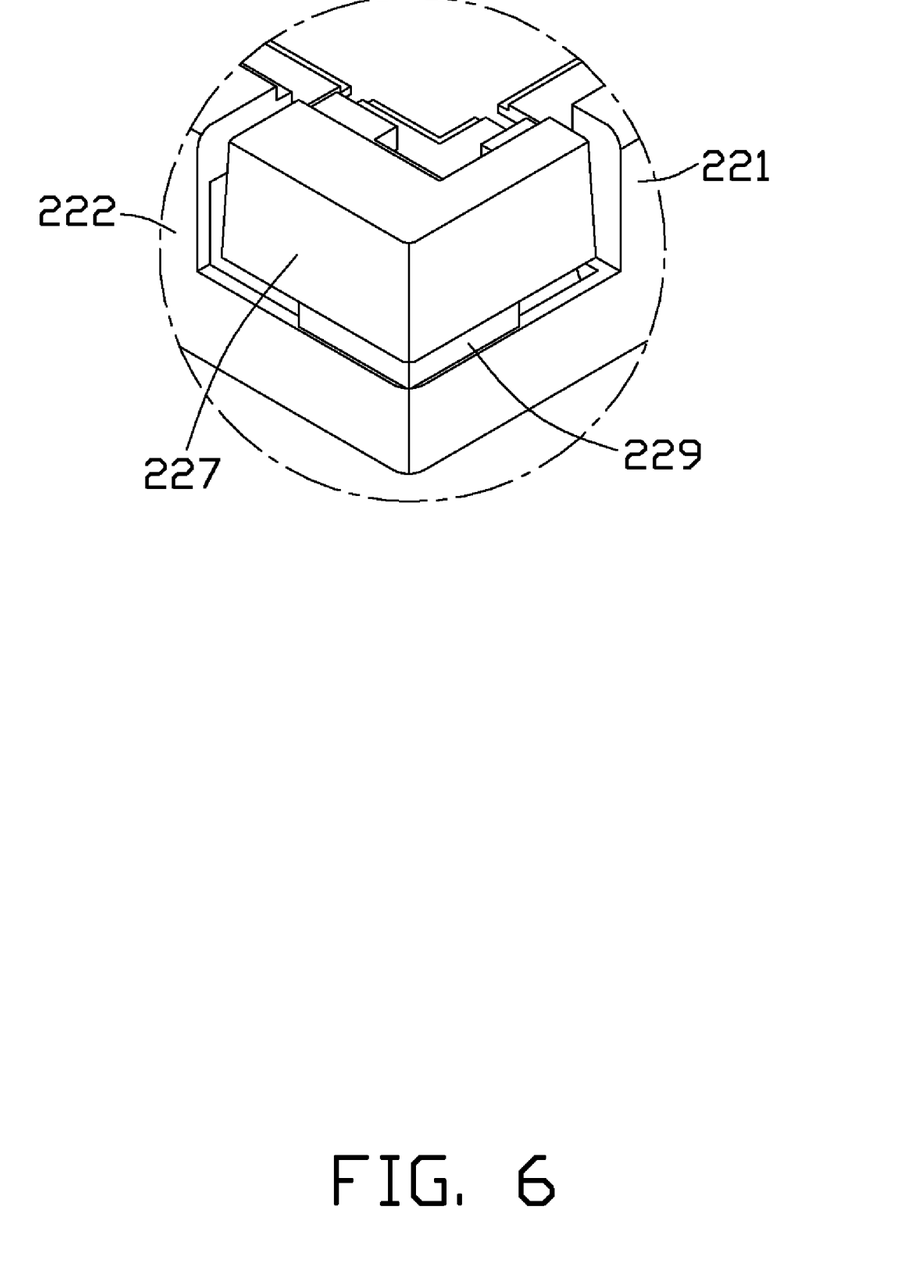
FIG. 6 is an enlarged view of a circled portion VI of FIG. 5.
Figure 7:
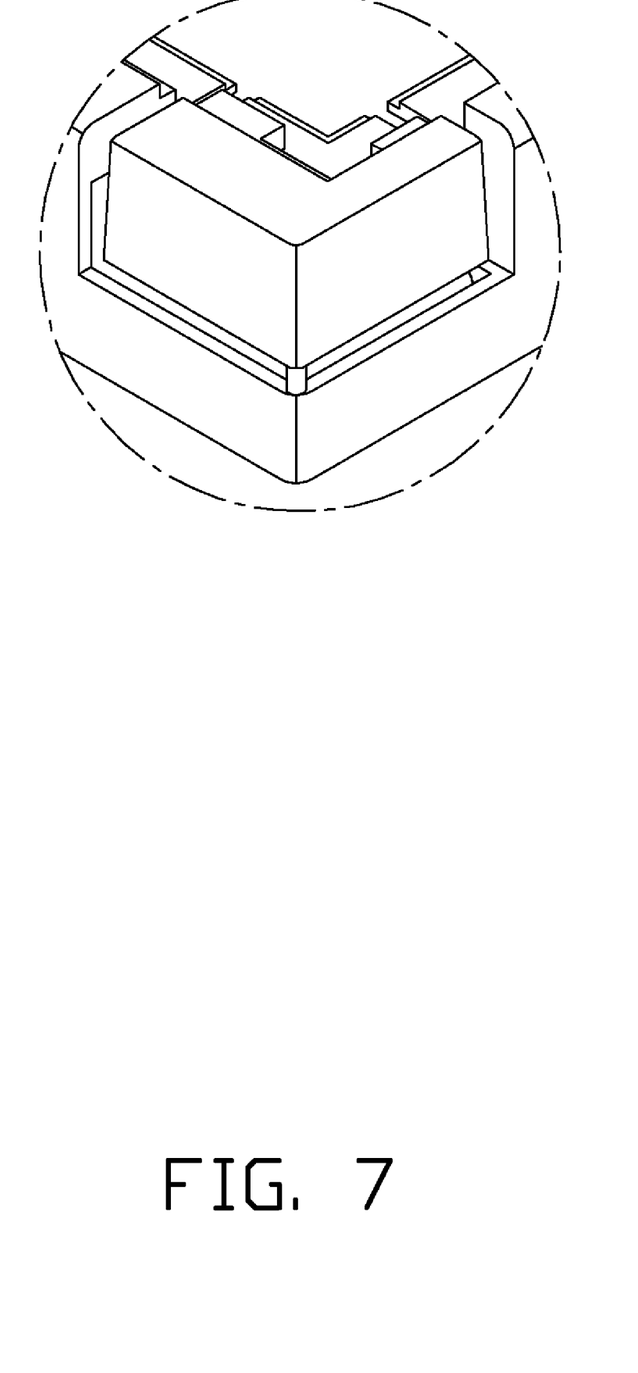
FIG. 7 is similar to FIG. 6, but showing a configuration of an alternative embodiment.

Referring to FIG. 5 and FIG. 6, a liquid crystal display 2 according to a second embodiment of the present invention is similar to the liquid crystal display 1. However, the liquid crystal display 2 includes a frame 22. The frame 22 includes a first side wall 221, a second side wall 222, a third side wall 223, and a fourth side wall 224 consecutively arranged end to end. The frame 22 further includes a pair of elastic members 227 respectively located at a joint between the first and second side walls 221, 222, and at a joint between the second and third side walls 222, 223. Each of the elastic members 227 is inseparably integrated with a base 229, which is inseparably formed with the frame 22. The base 229 has a substantially cubic (rectangular) structure. When the liquid crystal panel 11 is assembled to the frame 22, horizontal and vertical surfaces defining a third groove (not labeled) are substantially coplanar with horizontal and vertical surfaces defining the corresponding fifth groove (not labeled). In an alternative embodiment, the base 229 has a substantially cylindrical structure, as is shown in FIG. 7. In other respects, the liquid crystal display 2 has features and advantages similar to those described above in relation to the liquid crystal display 1.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A liquid crystal display, comprising:
   a liquid crystal panel; and
   a one-piece frame accommodating the liquid crystal panel, the frame comprising:
   a surrounding wall defining at least one notch in an upper side of the surrounding wall;
   a supporting board extending inward from an inner surface of the surrounding wall, the surrounding wall and the supporting board cooperatively defining a space for accommodating the liquid crystal panel; and
   at least one liquid crystal panel fixing member upwardly extending from bottom of the at least one notch, the at least one liquid crystal panel fixing member being deformable and inclined towards the space in a free state, and being capable of being outwardly pressed by application of an external force in a direction away from the space to allow the liquid crystal panel to be placed in the space, and elastically pressing the liquid crystal panel toward the supporting board after releasing of the external force.

2. The liquid crystal display as claimed in claim 1, wherein the at least one liquid crystal panel fixing members press peripheral regions of the liquid crystal panel.

3. The liquid crystal display as claimed in claim 1, wherein the one-piece frame has three liquid crystal panel fixing members, and the three liquid crystal panel fixing members are arranged at points of an imaginary triangle.

4. The liquid crystal display as claimed in claim 1, wherein a first groove is defined in a top of the one-piece frame, the first groove is defined where the surrounding wall adjoins the supporting board, and the first groove is parallel to the surrounding wall.

5. The liquid crystal display as claimed in claim 4, wherein each of the at least one liquid crystal panel fixing member defines a generally L-shaped second groove corresponding to the first groove of the surrounding wall, the L-shaped second groove comprising two linear groove portions perpendicular to each other, with the groove portions of the second groove being generally in alignment with the first groove, and when the liquid crystal panel is assembled to the frame, a horizontal and a vertical surfaces defining each groove portion of the second groove are substantially coplanar with a horizontal and a vertical surfaces defining the first groove.

6. The liquid crystal display as claimed in claim 5, wherein when the liquid crystal panel is disassembled from the frame, the horizontal surface defining each groove portion of the second groove of each of the at least one liquid crystal panel fixing member is below the horizontal surface defining the first groove.

7. The liquid crystal display as claimed in claim 1, wherein each of the at least one liquid crystal panel fixing member also elastically presses the liquid crystal panel toward the surrounding wall where the liquid crystal panel fixing member is located after the releasing of the external force.

8. The liquid crystal display as claimed in claim 1, wherein outer surfaces of each of the at least one liquid crystal panel fixing member is substantially coplanar with respective outer surface of the surrounding wall when the liquid crystal panel is assembled to the frame.

9. The liquid crystal display as claimed in claim 1, wherein the at least one liquid crystal panel fixing member is inseparably formed with the frame.

10. The liquid crystal display as claimed in claim 9, wherein each of the at least one liquid crystal panel fixing member is inseparably formed with a base which is inseparably integrated with the frame.

11. The liquid crystal display as claimed in claim 10, wherein the base comprises a substantially cubic structure.

12. The liquid crystal display as claimed in claim 10, wherein the base comprises a substantially cylindrical structure.

13. A liquid crystal display, comprising:
    a liquid crystal panel; and
    a frame accommodating the liquid crystal panel, the frame comprising:
    a surrounding wall;
    a supporting board extending inward from an inner surface of the surrounding wall, the surrounding wall and the supporting board cooperatively defining a space for accommodating the liquid crystal panel; and
    at least one liquid crystal panel fixing member mounted on the surrounding wall, the at least one liquid crystal panel fixing member inclined towards the space in a free state, and being outwardly pressed by application of an external force in a direction away from the space to allow the liquid crystal panel to be placed in the space, and elastically pressing the liquid crystal panel toward the supporting board after releasing of the external force.

14. The liquid crystal display as claimed in claim 13, wherein the frame has three liquid crystal panel fixing members, and the three liquid crystal panel fixing members are arranged at points of an imaginary triangle.

15. The liquid crystal display as claimed in claim 13, wherein a first groove is defined in a top of the frame, the first groove is defined where the surrounding wall adjoins the supporting board, and the first groove is parallel to the surrounding wall.

16. The liquid crystal display as claimed in claim 15, wherein each of the at least one liquid crystal panel fixing member defines a generally L-shaped second groove corresponding to the first groove of the surrounding wall, the L-shaped second groove comprising two linear groove portions perpendicular to each other, with the groove portions of the second groove being generally in alignment with the first groove, and when the liquid crystal panel is assembled to the frame, a horizontal and a vertical surfaces defining each groove portion of the second groove are substantially coplanar with a horizontal and a vertical surfaces defining the first groove.

17. The liquid crystal display as claimed in claim 16, wherein when the liquid crystal panel is disassembled from the frame, the horizontal surface defining each groove portion of the second groove of each of the at least one liquid crystal panel fixing member is below the horizontal surface defining the first groove.

18. The liquid crystal display as claimed in claim 13, wherein the frame has three liquid crystal panel fixing members, and the three liquid crystal panel fixing members are arranged at points of an imaginary triangle.

19. A liquid crystal display, comprising:

a liquid crystal panel; and a frame comprising:

- a surrounding wall defining a notch in the surrounding wall;
- a supporting board extending inward from an inner surface of the surrounding wall, the surrounding wall and the supporting board cooperatively defining a space for accommodating the liquid crystal panel; and
- a fixing member received in the notch, the fixing member being deformable;

wherein the fixing member is inclined toward the space in a free state, and is outwardly pressed by application of an external force in a direction away from the space to allow the liquid crystal panel to be placed in the space and on the supporting board, and elastically holds the liquid crystal panel in position against the supporting board after releasing of the external force.

20. The liquid crystal display as claimed in claim 19, wherein the frame has two another fixing members, and the three fixing members are arranged at points of an imaginary triangle, cooperatively clamping the liquid crystal panel.

* * * * *